United States Patent
Vageline et al.

(10) Patent No.: US 7,853,728 B2
(45) Date of Patent: * Dec. 14, 2010

(54) SYSTEM AND ARTICLE OF MANUFACTURE FOR EXECUTING INITIALIZATION CODE TO CONFIGURE CONNECTED DEVICES

(75) Inventors: Michael P. Vageline, Tucson, AZ (US); Kurt Allen Lovrien, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 152 days.

This patent is subject to a terminal disclaimer.

(21) Appl. No.: 12/187,291

(22) Filed: Aug. 6, 2008

(65) Prior Publication Data
US 2008/0313490 A1    Dec. 18, 2008

Related U.S. Application Data

(63) Continuation of application No. 11/291,050, filed on Nov. 29, 2005, now Pat. No. 7,428,602.

(51) Int. Cl.
*G06F 3/00* (2006.01)
*G06F 11/00* (2006.01)
*G06F 15/177* (2006.01)

(52) U.S. Cl. .............................. 710/8; 714/2; 709/220; 709/221; 709/222; 709/223

(58) Field of Classification Search ...................... 710/8; 714/2; 709/220–223
See application file for complete search history.

(56) References Cited

U.S. PATENT DOCUMENTS

| | | | |
|---|---|---|---|
| 4,228,496 A | 10/1980 | Katzman et al. | |
| 5,437,022 A | 7/1995 | Beardsley et al. | |
| 7,428,602 B2 | 9/2008 | Vageline et al. | |
| 2002/0016827 A1 | 2/2002 | McCabe et al. | |
| 2002/0023179 A1 | 2/2002 | Stanley | |
| 2002/0188711 A1 | 12/2002 | Meyer et al. | |
| 2003/0018927 A1 | 1/2003 | Gadir et al. | |
| 2004/0233852 A1 | 11/2004 | Ochi et al. | |
| 2005/0027892 A1 | 2/2005 | McCabe et al. | |

*Primary Examiner*—Alford W Kindred
*Assistant Examiner*—Farley J Abad
(74) *Attorney, Agent, or Firm*—David W. Victor; Konrad Raynes & Victor LLP (57) ABSTRACT

Provided are a system and article of manufacture for executing initialization code to configure connected devices. A plurality of segments are provided to configure at least one connected device, wherein each segment includes configuration code to configure the at least on connected device. The segments are executed according to a segment order by executing the configuration code in each segment to perform configuration operations with respect to the at least one connected device. Completion of the segment is indicated in a memory in response to completing execution of the configuration operations for the segment.

20 Claims, 6 Drawing Sheets

Checkpoint Information

FIG. 4

Segment Completion Information

SYSTEM AND ARTICLE OF MANUFACTURE FOR EXECUTING INITIALIZATION CODE TO CONFIGURE CONNECTED DEVICES

RELATED APPLICATIONS

This patent application is a continuation of U.S. patent application Ser. No. 11/291,050 now U.S. Pat. No. 7,428,602, filed on Nov. 29, 2005.

BACKGROUND OF THE INVENTION

1. Field of the Invention

The present invention relates to a system and article of manufacture for executing initialization code to configure connected devices.

2. Description of the Related Art

Host systems in a storage network may communicate with a storage controller through multiple paths. The storage controller may be comprised of separate storage clusters, where each storage cluster is capable of accessing the storage and provide redundancy to access the storage. Hosts may access the attached storage through either cluster. If a storage cluster fails, then the host may failover to using the other storage cluster to access the storage. Further, the clusters may buffer writes to the other cluster in a non-volatile storage (NVS) so that if one cluster fails, recent writes to the storage device are maintained in the NVS of the non-failing cluster. In such dual cluster systems, each cluster must be configured to use the logical devices, e.g., logical subsystems (LSS), configured in the attached storage.

In dual cluster systems, each cluster separately executes initialization code, such as the initial microcode load (IML) to configure the clusters to access connected devices, such as bus interfaces, storage devices, adaptors, etc. Each cluster maintains a separate set of configuration information to use to access the connected devices. If a failure occurs during the configuration and error recovery procedures are not able to recover from the failure to continue with the configuration and initialization, then an administrator may have to manually edit and reconfigure each cluster's settings to return the dual cluster system to a state prior to the start of the failed initialization and configuration.

There is a need in the art for improved techniques to handle a failure during configuration operations.

SUMMARY

Provided are a method, system, and program for executing initialization code to configure connected devices. A plurality of segments are provided to configure at least one connected device, wherein each segment includes configuration code to configure the at least one connected device. The segments are executed according to a segment order by executing the configuration code in each segment to perform configuration operations with respect to the at least one connected device. Completion of the segment is indicated in a memory in response to completing execution of the configuration operations for the segment.

DETAILED DESCRIPTION

Figure 1:
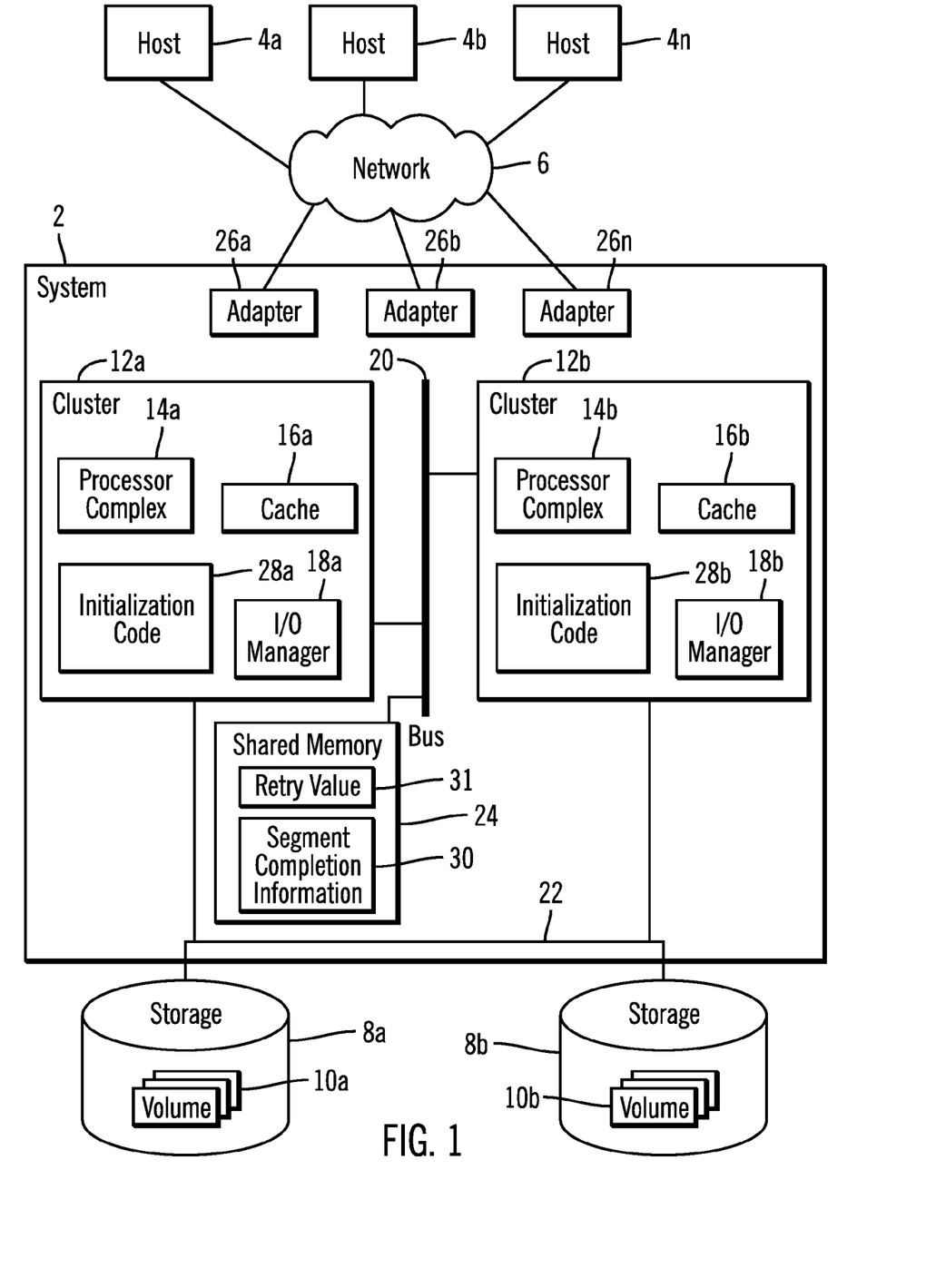
FIG. 1 illustrates an embodiment of a computing environment.

FIG. 1 illustrates an embodiment of a network computing environment. A system 2 receives Input/Output (I/O) requests from host systems 4a, 4b . . . 4n over a network 6 directed toward storages 8a, 8b each configured to have one or more volumes 10a, 10b (e.g., Logical Unit Numbers, Logical Devices, etc.). The system 2 includes two clusters 12a, 12b, each including a processor complex 14a, 14b and a cache 16a, 16b. The clusters 12a, 12b receive I/O requests from the hosts 4a, 4b . . . 4n and buffer the requests and write data in their respective cache 16a, 16b to the storage 8a, 8b. The clusters 12a, 12b may include additional components, such as a non-volatile storage unit (not shown) to provide backup storage of updates in the cache 16a, 16b. The clusters 12a, 12b may have different power boundaries. In the described embodiment, each storage cluster 12a, 12b provides access to attached storage comprising the storages 8a, 8b. Each cluster 12a, 12b includes I/O manager software 18a, 18b executed by the processor complexes 14a, 14b to process host 4a, 4b . . . 4n I/O requests. A bus 20 provides a communication interface to enable communication between the clusters 12a, 12b. A bus 22 provides communication among the clusters 12a, 12b and the storages 8a, 8b. The buses 20 and 22 may comprise a suitable communication interface known in the art, such as Peripheral Component Interconnect (PCI) bus, or other bus interfaces. The buses 20 and 22 may be connected, separate and/or comprise multiple connected bus devices.

The clusters 12a, 12b may both access a shared memory 24 over the bus 20 or some other interface. The shared memory 24 may comprise a hard disk drive, non-volatile electronic memory, etc. Alternatively, the shared memory 24 may comprise copies of the same data in each cluster if there is no separate shred memory device, such that the copies in each cluster are kept in synchronization for the non-master to take over the configuration if the master crashes. Synchronization of the copies may occur at the completion of each segment. Shared memory 24 may be updated to note the completion of each segment by each cluster 12a, 12b. Further, the shared memory 24 may include segment checkpoint information for each cluster, which indicates whether either cluster 12a, 12b has completed the segment.

Further, clusters 12a, 12b may access the adaptors 26a, 26b . . . 26n to communicate with the hosts 4a, 4b . . . 4n. The adaptors may be implemented within the cluster 12a, 12b hardware or external to the clusters 12a, 12b. The clusters 12a, 12b further include initialization code 28a, 28b, such as the initial microcode load (IML), that the clusters 12a, 12b execute to configure connected devices for use. The configuration operations may comprise loading and configuring drivers and the connected devices to enable access and communication with the connected devices. For instance, the clusters 12a, 12b execute the initialization code 28a, 28b to configure the clusters 12a, 12b to use the bus 20, storage volumes 10a, 10b, and the adaptors 26a, 26b . . . 26n, and any devices connected to the adaptors 26a, 26b . . . 26n, such as the hosts 4a, 4b . . . 4n. The configuration operations may involve updating data structures in the cluster 12a, 12b memory, e.g., cache 16a, 16b, to use the devices. For instance, the configuration code may configure the clusters 12a, 12b to be able to access the volumes 10a, 10b in storage or configure virtualization devices. Segment completion information 30 includes information on segments or sections of the configuration code whose execution has completed successfully. In certain embodiments, the shared memory 24 maintains information after a configuration error occurs so that the information may be provided to an error recovery procedure following a failure during initialization and restart, such as a warm start.

The system 2 may comprise a storage controller or server. In an alternative embodiment, the system 2 may comprise different types of computer devices that perform initialization and configuration operations of connected devices. The hosts 4a, 4b . . . 4n may comprise computing devices known in the art, such as a server, mainframe, workstation, personal computer, hand held computer, laptop, telephony device, network appliance, etc. The network 6 may comprise a Storage Area Network (SAN), Local Area Network (LAN), Intranet, the Internet, Wide Area Network (WAN), etc. The storage 8a, 8b may comprise an array of storage devices, such as a Just a Bunch of Disks (JBOD), Direct Access Storage Device (DASD), Redundant Array of Independent Disks (RAID) array, virtualization device, tape storage, flash memory, etc.

Figure 2:
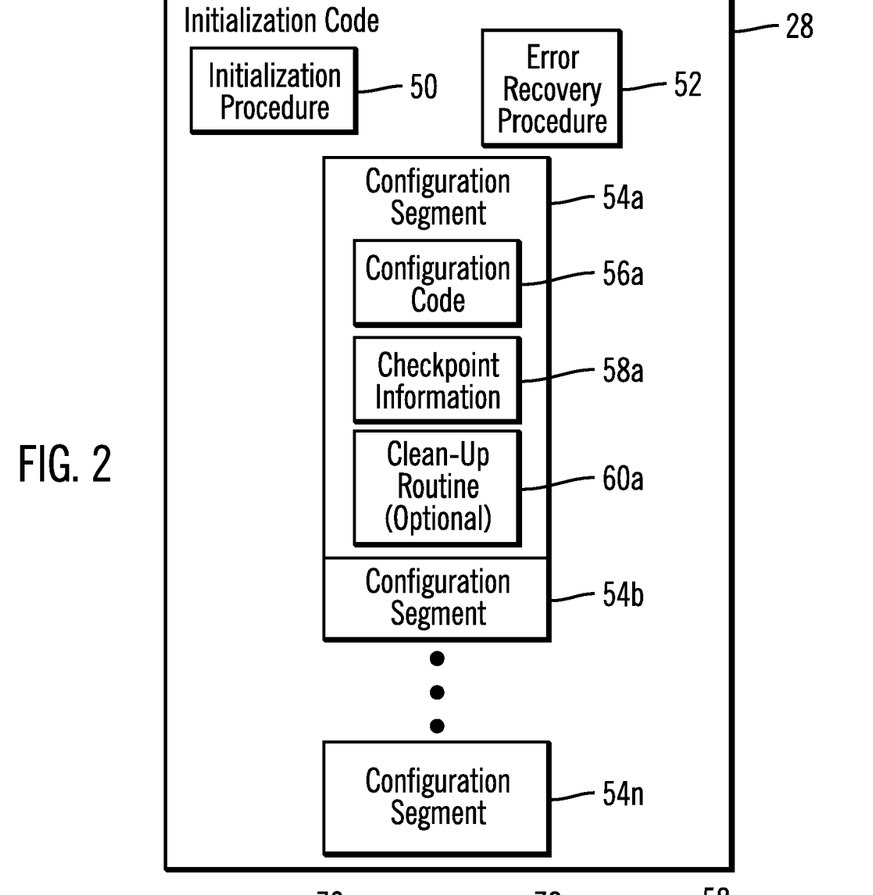
FIG. 2 illustrates components in the initialization code.

FIG. 2 illustrates components of the initialization code 28, such as initialization code copies 28a, 28b, including an initialization procedure 50 that is executed to perform initialization configuration operations and an error recovery procedure (ERP) 52 executed in response to detecting a failure during initialization and configuration operations. The initialization code 28 further includes the configuration code organized in segments 54a, 54b . . . 54n, where each segment comprises a section of the configuration code 56a, 56b . . . 56n and checkpoint information 58a, 58b . . . 58n. An optional clean-up routine may be associated with each segment 54a, 54b . . . 54n. Execution of the clean-up routine 60a, 60b . . . 60n associated with a segment returns the cluster configuration to a state before the configuration code 56a, 56b . . . 56n of the associated segment 54a, 54b . . . 54n was executed. The clean-up routine 60a, 60b . . . 60n may delete certain information in memory and registers and otherwise reverse settings caused by the execution of the failed configuration code.

The segments 54b . . . 54n include configuration code 56b, 56c (not shown), checkpoint information 58b . . . 58n (not shown), and optionally a clean-up routine 60b . . . 60n (not shown). The clean-up routines 60a . . . 60n may be stored separately from the configuration code. In one embodiment, the configuration code 54a, 54b . . . 54n may be implemented in one or more programs having checkpoints separating the different segments of the configuration code 54a, 54b . . . 54n. Alternatively, each segment of configuration code 54a, 54b . . . 54n may be separately addressable, where the checkpoint information for a segment provides information on the segment. The configuration code 54a . . . 54n in each segment may perform a separate configuration operation.

Figure 3:
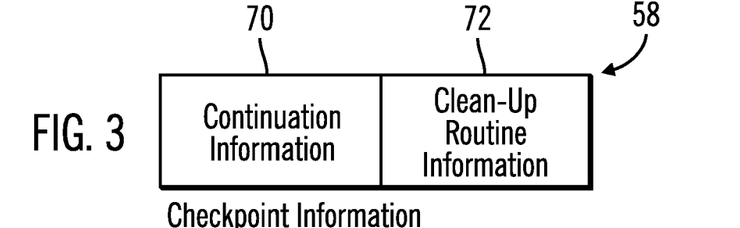
FIG. 3 illustrates an embodiment of checkpoint information.

FIG. 3 illustrates an embodiment of information that may be included with the checkpoint information 58 for a segment, such as checkpoint information 58a, including continuation information 70 and a clean-up routine information 72. The continuation information 70 indicates whether during an error recovery procedure (ERP) 52 configuration may continue from a segment if a failure occurred while executing the configuration code 56a, 56b . . . 56n for that segment 54a, 54b . . . 54n. The clean-up routine information 72 identifies a clean-up routine that when executed returns the cluster or system configuration to a state before the configuration code of the failed segment was executed. However, changes made as a result of those configuration code segments executed and completed prior to the attempted execution segment of configuration code in which the failure occurred remain in effect. A segment may not have a clean-up routine if code does not need to be executed to reverse any changes that could have occurred during the execution of the configuration code that failed.

Figure 4:
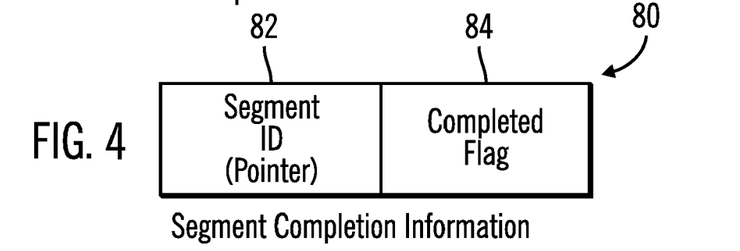
FIG. 4 illustrates an embodiment of segment completion information.

FIG. 4 illustrates an instance 80 of information included with the segment completion information 30 (FIG. 1) for one segment 54a, 54b . . . 54n, including a segment identifier or pointer 82 identifying or addressing a segment of configuration code 56a, 56b . . . 56n and a completion flag 84 indicating whether execution of the identified configuration code succeeded. Thus, each time the system completes execution of configuration code for one segment, information indicating that successful completion is indicated in the completion flag 84 in the instance 80 of the segment completion information for that successfully executed segment of configuration code. This information allows the system to determine a last successfully completed segment. A segment order indicates the order in which the configuration code is executed, where the order may be determined from the order in which the program executes segments of configuration code.

Figure 5:
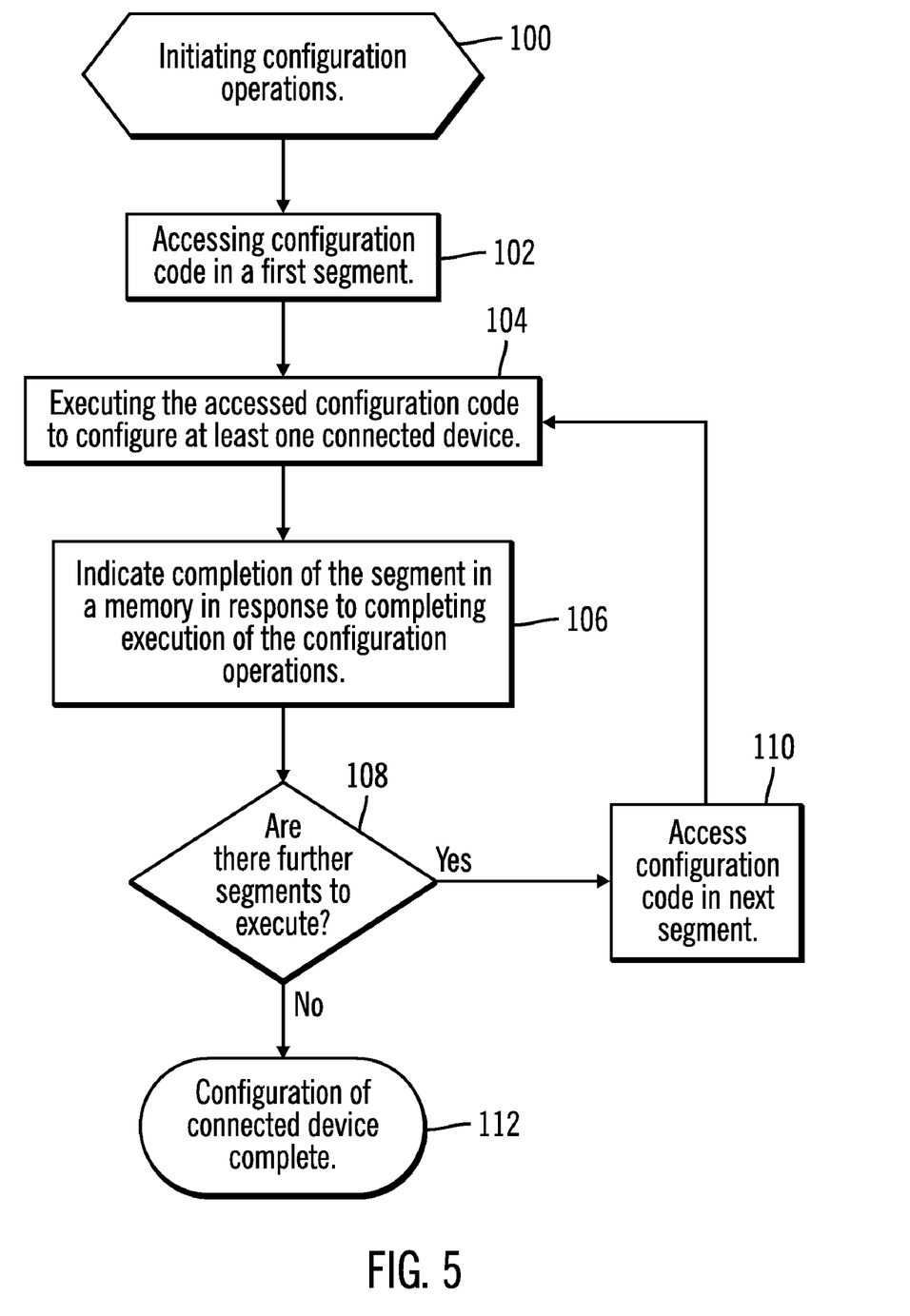
FIG. 5 illustrates an embodiment of operations to execute configuration code.

FIG. 5 illustrates an embodiment of operations performed by the initialization code 50 when executed by a system including one or more clusters. The operations of FIG. 5 may be performed by a system having only one cluster, such as cluster 12a, to configure devices attached to the single cluster device, such as a system with a single processor, etc. In a single cluster, i.e., processor, environment, the shared memory comprises a non-volatile memory used by the processor during configuration. Upon initiating configuration operations (at block 100) by executing the initialization procedure 50, the initialization procedure 50 accesses (at block 102) the configuration code 56a in a first segment 54a and executes (at block 104) to configure at least one connected device, such as a logical device, storage area, memory area, adaptor, etc. Upon successfully completing execution of the configuration code, completion of the segment is indicated (at block 106) in the non-volatile memory, e.g., 24. In one embodiment, completion of the configuration code for a segment may be indicated by setting the completed flag 84 for the segment 82 in the segment completion information instance 80 for the completed segment. If (at block 108) there are there further segments 54a, 54b . . . 54n to execute, then the configuration code 56b . . . 56n for the next segment in the initialization code 28 is accessed (at block 110) and control proceeds back to block 104 to execute the next accessed configuration code 56b . . . 56n. After executing the configuration code for all segments, configuration complete is returned (at block 112) and the shared memory 24 is updated to remove the configuration operation which succeeded or failed.

Figure 6:
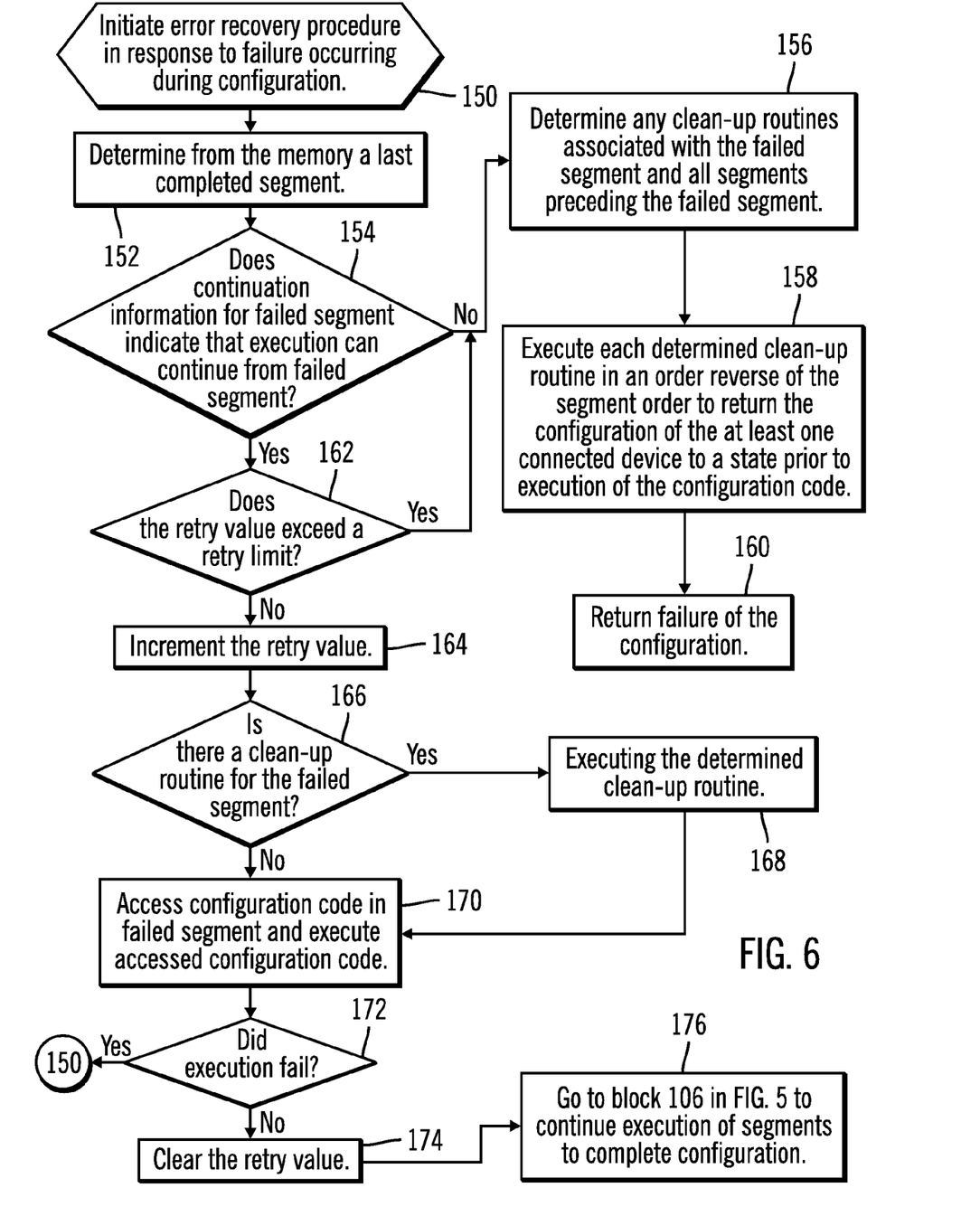
FIG. 6 illustrates an embodiment of operations for an error recovery procedure to recover from a failure during execution of the configuration code.

FIG. 6 illustrates an embodiment of operations performed by an error recovery procedure (ERP) 52 in response to detecting a failure during execution of the configuration code in FIG. 5. The operations of FIG. 6 may be executed by a single or multiple cluster system to configure connected devices, e.g., bus interfaces, storage devices, adaptors, etc. In response to initiating (at block 150) the ERP 52 after a failure occurs while executing a segment of configuration code 56a, 56b . . . 56n in one segment, the ERP 52 determines (at block 152) from the memory 24 a last completed segment. In general, there are three ways to initiate a segment ERP, a segment failure causes a branch to the segment ERP (at blocks 150 and 250); a segment failure causes a system ERP, where after the system ERP the failed segment is detected by the master in the shared memory and segment ERP is initiated; and a segment failure causes a system reboot, where after the system IML the failed segment is detected by the master in the shared memory and segment ERP is initiated. The last completed segment may comprise the last segment in the segment order whose completed flag 82 is set. If (at block 154) continuation information for the failed segment, such as the continuation information 70 (FIG. 3) in the checkpoint information 58a, 58b . . . 58n for the failed segment, indicates that execution cannot continue from the failed segment, then the ERP 52 determines (at block 156) any clean-up routines 60a, 60b . . . 60n associated with the failed segment and all segments preceding the failed segment, whose execution successfully completed. Running the cleanup routine 60a, 60b . . . 60n for a single failed segment may then allow that failed segment to be retried. In certain situations, the failed segment could not be retried from the failure point partway through the failed segment without running the cleanup routine. The determined clean-up routines 60a, 60b . . . 60n are executed (at block 158) in an order reverse of the segment order to return the configuration of the at least one connected device to a state prior to execution of the configuration code. Failure to the configuration is then returned (at block 160).

If (at block 154) the configuration information 70 indicates that configuration may continue from the failed segment and if (at block 162) a retry value 31 (FIG. 1), indicating a number of times that the ERP 52 has attempted to retry executing the failed configuration code, is greater than a retry limit, then control proceeds to block 156 to begin the process of failing the configuration. The retry value may be maintained in the non-volatile memory, such as shown as retry value 31 in the shared memory 24 in FIG. 1. Otherwise, if (at block 162) the retry value 31 is less than the retry limit, then the retry value is incremented (at block 164). If (at block 166) there is a clean-up routine 60a, 60b . . . 60n for the failed segment, i.e., the segment having configuration code where the failure occurred, then the ERP 52 executes (at block 168) the determined clean-up routine 60a . . . 60n to return the system to the state that existed prior to the execution of the configuration code where the failure was experienced. From block 168 or the no branch of block 166, the configuration code 56a, 56b . . . 56n in the failed segment 54a, 54b . . . 54n is accessed (at block 170) and executed. If (at block 172) the execution of the configuration code at block 170 failed, then control proceeds back to block 150. Otherwise, if the configuration code 56a, 56b . . . 56n successfully executed at block 170, then the retry value 31 is cleared (at block 174) and control proceeds (at block 176) to block 106 in FIG. 5 to continue execution of the configuration code in the segments 54a, 54b . . . 54n to complete the configuration.

With the operations of FIG. 6, the system executing the initialization code 28 may recover from a failure and try to execute configuration code from the point where the failure occurred to avoid having to restart configuration from the beginning and to allow automatic recovery of the configuration process.

Figure 7:
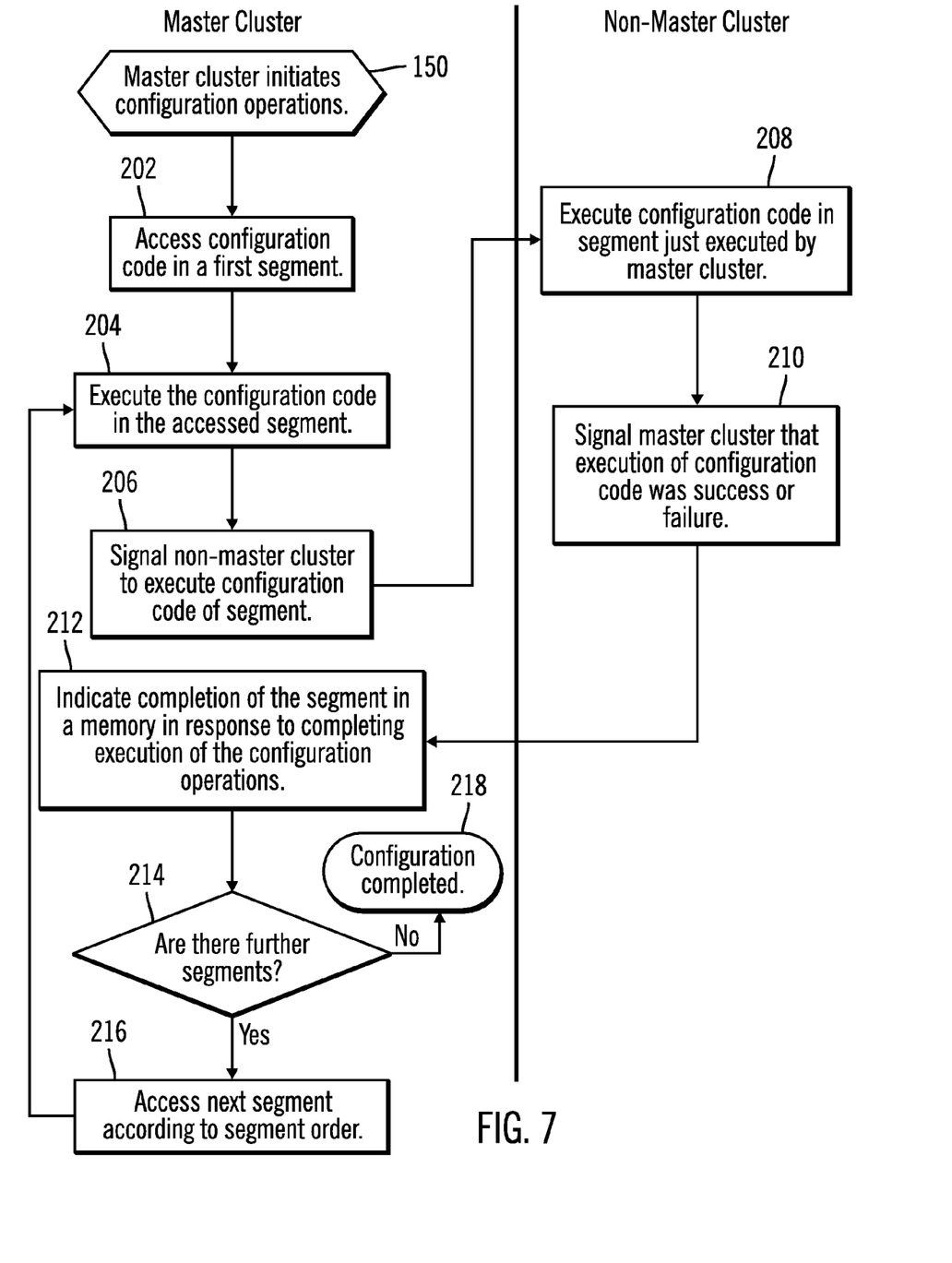
FIG. 7 illustrates an embodiment of embodiment of operations to execute configuration code in a dual cluster environment.
Figure 8:
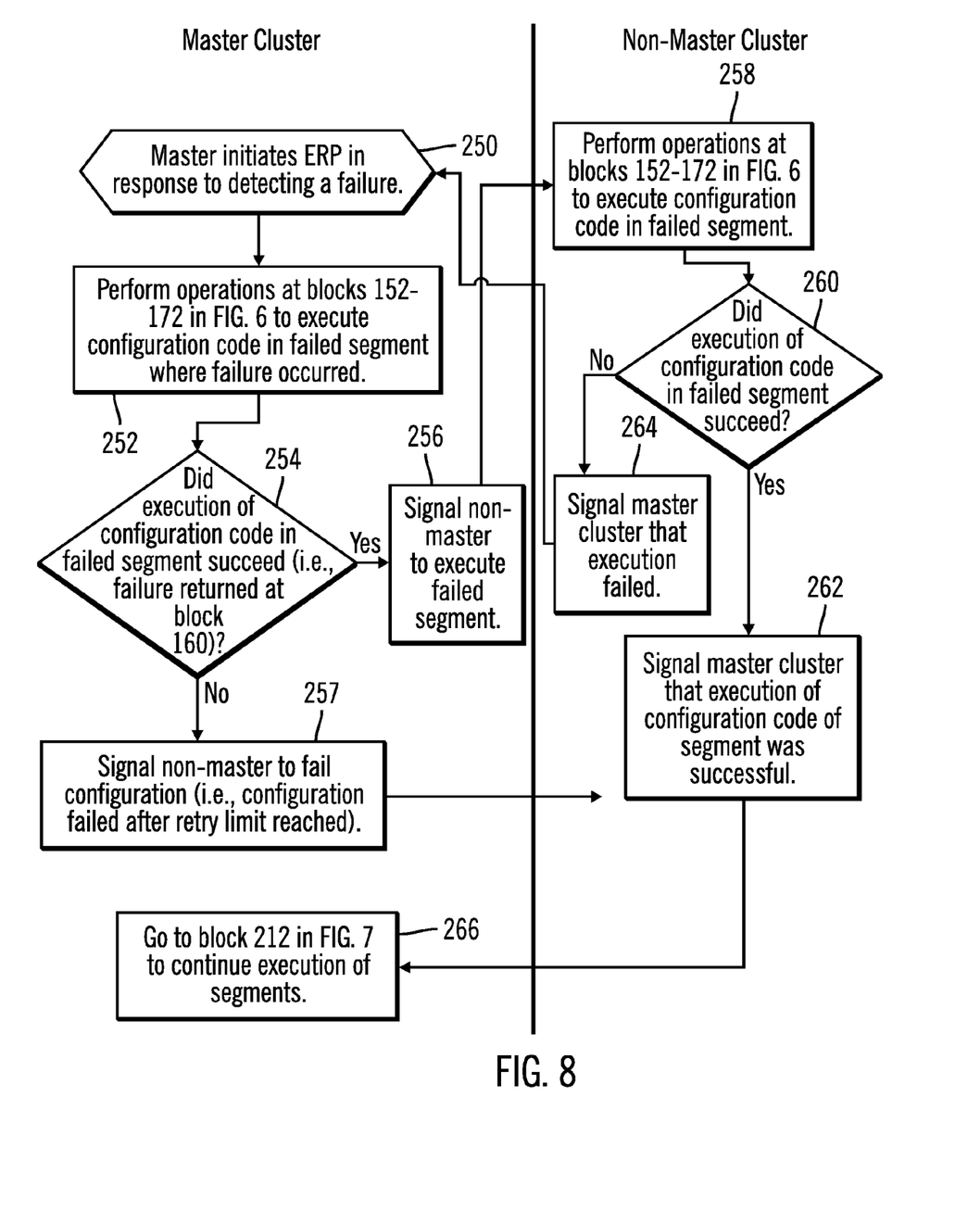
FIG. 8 illustrates an embodiment of operations for an error recovery procedure to recover from a failure during execution of the configuration code in a dual cluster environment.

FIGS. 7 and 8 illustrate an embodiment of operations executed by clusters 12a, 12b in a multi-cluster system 2 (FIG. 1) to configure connected devices, such as busses 20, 22, adaptors 26a, 26b . . . 26n and storages 8a, 8b. The clusters 12a, 12b may configure shared resources, such as the storages 8a, 8b and busses 20 and 22 that both access. One cluster, such as cluster 12a, may be designated as a master during configuration and the other cluster, such as cluster 12b, may be designated as a non-master, where either cluster 12a, 12b may be designated as the master. In one embodiment, the configuration for the entire system 2 may fail if both clusters 12a, 12b cannot access the shared memory 24.

With respect to FIG. 7, upon the master cluster 12a initiating (at block 200) configuration operations, the master cluster 12a accesses (at block 202) a first segment of the configuration code 56a and executes (at block 204) the accessed configuration code 56a. Upon successful completion, the master cluster 12a signals, i.e., messages, (at block 206) the non-master cluster 12b to execute the configuration code of the segment. The master cluster 12a may further transfer to the non-master cluster 12 configuration data associated with the configuration code just executed. In response to the signal, the non-master cluster 12b executes (at block 208) the configuration code in the segment just executed by the master cluster 12a. Upon successful completion, the non-master cluster 12b, signals (at block 210) master cluster that execution of the configuration code was success or failure.

In response to the completion from the non-master cluster 12b, the master cluster 12a indicates (at block 212) completion of the segment in the shared memory 24. This indication at block 212 may involve setting the completed flag 84 in the segment completion information instance 80 for the 82 segment whose configuration code was executed successfully by both clusters 12a, 12b. In this embodiment, the indication of completion indicates that both clusters 12a, 12b successfully completed executing the configuration code 56a, 56b . . . 56bn for the segment.

If (at block 214) there are further segments of configuration code 56a, 56b . . . 56n to execute, then the configuration code 56b . . . 56n for a next segment is accessed (at block 216), according to a segment ordering in which the configuration code for the segments is executed, and control proceeds back to block 204 to execute the configuration code 56b . . . 56n for the next accessed segment. After the configuration code for all segments is successfully executed by both clusters 12a, 12b, the configuration is complete (at block 112) and the shared memory 24 is updated to remove the configuration operation which succeeded or failed.

FIG. 8 illustrates an embodiment of error recovery operations performed by the master cluster 12a in response to detecting a failure during execution of the configuration code, where a configuration failure may occur when either the master 12a or non-master 12b cluster is executing the configuration code according to the operations of FIG. 7. In response to executing the ERP 52 (at block 250), the master cluster 12a performs (at block 252) the operations at blocks 152-172 in FIG. 6 to execute the configuration code from the segment that was being executed when the failure occurred. If (at block 254) execution of the configuration code 56a, 56b . . . 56n in the failed segment 54a, 54b . . . 54n succeeds, then the master cluster 12a signals (at block 256) the non-master cluster 12b to execute the configuration code 56a, 56b . . . 56n from the failed segment. The master cluster 12a proceeds (at block 266) to block 212 in FIG. 7 to continue with executing the configuration code in further segments. If (at block 254) execution of the configuration code failed (which occurs if failure is returned at block 160 in FIG. 6 due to the retry limit being exceeded or if at block 154 the continuation information indicates that execution cannot continue from a failed segment), then the master cluster 12a signals (at block 257) the non-master 12b to fail the configuration.

Upon receiving the signal to execute the failed segment from the master cluster 12*a*, the non-master cluster 12*b* performs (at block 258) the operations at blocks 152-172 in FIG. 6 to execute configuration code in the failed segment. If (at block 260) execution of the configuration code in the failed segment succeeds, then the non-master cluster 12*b* signals (at block 262) the master cluster 12*a* that execution of the configuration code 56*a*, 56*b* . . . 56*n* of the segment was successful. In response to this signal, the master cluster 12*a* proceeds to block 212 et seq. in FIG. 7 to continue execution of the configuration code for the segments. If (at block 260) execution of the configuration code by the non-master cluster 12*b* failed (which occurs if failure is returned at block 160 in FIG. 6 due to the retry limit being exceeded or if at block 154 the continuation information indicates that execution cannot continue from a failed segment), then the non-master cluster 12*b* signals (at block 262) the master 12*a* of the failure.

With the described operations of FIGS. 7 and 8, the master 12*a* and non-master 12*b* clusters each execute the configuration code for a segment and coordinate their execution of the configuration code for the segments. If there is a failure, then the master cluster 12*a* retries to execute the configuration code in the segment where the failure occurred and then signals the non-master to also execute the configuration code from the failed segment. Further, if the master crashes during configuration operations, then the non-master becomes the master and queries the shared memory at the end of the system ERP. With the described operations, in the event of a failure, both clusters may try to start from the segment where the failure occurred.

ADDITIONAL EMBODIMENT DETAILS

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 5, 6, 7, and 8 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An article of manufacture comprising a computer readable storage medium having code capable of being used to configure at least one device connected to a system and to communicate with a memory, wherein the code causes operations to be performed, the operations comprising:
   providing a plurality of segments in the computer readable storage medium to configure at least one connected device, wherein each segment includes configuration code to configure the at least one connected device;
   executing the segments according to a segment order by executing the configuration code in each segment to perform configuration operations with respect to the at least one connected device;
   indicating completion of the segment in a memory in response to completing execution of the configuration operations for the segment;
   determining from the memory a last completed segment in the segment order in response to recovery from a failure, wherein the failure occurred while executing a failed segment following the last completed segment in the segment ordering;
   determining whether execution can continue from the failed segment; and
   executing the configuration code in the failed segment in response to determining that execution can continue from the failed segment.

2. The article of manufacture of claim 1, further comprising:
   determining whether there is a clean-up routine associated with the failed segment; and
   executing the determined clean-up routine in response to determining that there is the clean-up routine to return the configuration of the at least one connected device to a state prior to beginning execution of the failed segment, wherein the configuration code in the failed segment is executed in response to executing the clean-up routine.

3. The article of manufacture of claim 1, further comprising:
   determining whether a retry value exceeds a retry limit in response to determining that execution can continue from the failed segment;
   incrementing a retry value before executing the configuration code in the failed segment in response to determining that the retry value does not exceed the retry limit; and
   failing the recovery without retrying in response to determining that the retry value exceed the retry limit.

4. The article of manufacture of claim 1, further comprising:
   determining whether there is a clean-up routine associated with the failed segment and all segments preceding the failed segment in response to determining that execution cannot continue from the failed segment; and
   executing each determined clean-up routine in an order reverse of the segment order to return the configuration of the at least one connected device to a state prior to execution of the configuration code.

5. The article of manufacture of claim 4, wherein a different clean-up routine is associated with different segments to perform a clean-up specific to the segment configuration code.

6. The article of manufacture of claim 1, wherein the code is executed by a first and second clusters, wherein the code causes the first and second clusters to execute the segments and further perform:
   signaling, by the first cluster, the second cluster in response to executing one segment, wherein indicating completion of one segment in the memory further comprises indicating the first or second cluster that executed the configuration code in the completed segment; and
   executing, by the second cluster, the segment executed by the first cluster in response to receiving the signal to configure the at least one connected device for use by the second cluster.

7. The article of manufacture of claim 6, wherein the operations further comprise:
   indicating, by the first and second clusters, completion of the segment in the memory in response to completing execution of the configuration operations for the segment; and
   signaling, by the second cluster, the first cluster in response to executing one segment, wherein the first cluster executes a next segment in response to the signal.

8. The article of manufacture of claim 6, wherein the operations further comprise:
   detecting, by the first cluster, a failure during configuration;
   determining, by the first cluster, from the memory a last completed segment in response to detecting the failure, wherein the failure occurred by the first or second cluster executing a failed segment following the last completed segment in the segment ordering;
   determining, by the first cluster, whether execution can continue from the failed segment; and
   executing, by the first and second cluster, the configuration code in the failed segment in response to determining that execution can continue from the failed segment.

9. The article of manufacture of claim 8, wherein the first cluster determines from the memory the last completed segment and determines whether execution can continue from the failed segment, and wherein the first cluster further performs:
   determining whether there is a clean-up routine associated with the failed segment and all segments preceding the failed segment in response to determining that execution cannot continue from the failed segment;
   executing each determined clean-up routine in an order reverse of the segment order to return the configuration of the at least one connected device to a state prior to execution of the configuration code; and
   signaling the second cluster to cause the second cluster to execute each determined clean-up routine in the order reverse of the segment order to return the configuration of the at least one connected device to a state prior to execution of the configuration code.

10. The article of manufacture of claim 6, further comprising:
    failing the configuration in response to determining that either the first or second cluster cannot access the memory before executing the segments.

11. A system having connected devices, comprising
    a processor;
    a memory in communication with the processor;
    a computer readable storage medium including a plurality of segments to configure at least one connected device, wherein each segment includes configuration code to configure the at least one connected device and including code executed by the processor to perform operations, the operations comprising:

executing the segments according to a segment order by executing the configuration code in each segment to perform configuration operations with respect to the at least one connected device;

indicating completion of the segment in a memory in response to completing execution of the configuration operations for the segment;

determining from the memory a last completed segment in the segment order in response to recovery from a failure, wherein the failure occurred while executing a failed segment following the last completed segment in the segment ordering;

determining whether execution can continue from the failed segment; and     executing the configuration code in the failed segment in response to determining that execution can continue from the failed segment.

12. The system of claim 11, wherein the operations further comprise:

determining whether there is a clean-up routine associated with the failed segment; and     executing the determined clean-up routine in response to determining that there is the clean-up routine to return the configuration of the at least one connected device to a state prior to beginning execution of the failed segment, wherein the configuration code in the failed segment is executed in response to executing the clean-up routine.

13. The system of claim 11, wherein the operations further comprise:

determining whether a retry value exceeds a retry limit in response to determining that execution can continue from the failed segment;

incrementing a retry value before executing the configuration code in the failed segment in response to determining that the retry value does not exceed the retry limit; and     failing the recovery without retrying in response to determining that the retry value exceed the retry limit.

14. The system of claim 11, wherein the operations further comprise:

determining whether there is a clean-up routine associated with the failed segment and all segments preceding the failed segment in response to determining that execution cannot continue from the failed segment; and     executing each determined clean-up routine in an order reverse of the segment order to return the configuration of the at least one connected device to a state prior to execution of the configuration code.

15. The system of claim 14, wherein a different clean-up routine is associated with different segments to perform a clean-up specific to the segment configuration code.

16. The system of claim 11, wherein the processor, memory, and computer readable medium comprise a first cluster, further comprising:

a second cluster, wherein the first cluster signals the second cluster in response to executing one segment, wherein the second cluster executes the segment executed by the first cluster in response to receiving the signal to configure the at least one connected device for use by the second cluster, and wherein the first and second clusters indicate completion of executing one segment in the memory by indicating the first or second cluster that executed the configuration code in the completed segment.

17. The system of claim 16, wherein the operations further comprise:

indicating, by the first and second clusters, completion of the segment in the memory in response to completing execution of the configuration operations for the segment; and     signaling, by the second cluster, the first cluster in response to executing one segment, wherein the first cluster executes a next segment in response to the signal.

18. The system of claim 16, wherein the first and second cluster further perform:

detecting, by the first cluster, a failure during configuration;

determining, by the first cluster, from the memory a last completed segment in response to detecting the failure, wherein the failure occurred by the first or second cluster executing a failed segment following the last completed segment in the segment ordering;

determining, by the first cluster, whether execution can continue from the failed segment; and     executing, by the first and second cluster, the configuration code in the failed segment in response to determining that execution can continue from the failed segment.

19. The system of claim 18, wherein the first cluster determines from the memory the last completed segment and determines whether execution can continue from the failed segment, and wherein the first cluster further performs:

determining whether there is a clean-up routine associated with the failed segment and all segments preceding the failed segment in response to determining that execution cannot continue from the failed segment;

executing each determined clean-up routine in an order reverse of the segment order to return the configuration of the at least one connected device to a state prior to execution of the configuration code; and     signaling the second cluster to cause the second cluster to execute each determined clean-up routine in the order reverse of the segment order to return the configuration of the at least one connected device to a state prior to execution of the configuration code.

20. The system of claim 16, wherein the operations further comprise:

failing the configuration in response to determining that either the first or second cluster cannot access the memory before executing the segments.

\* \* \* \* \*